US011843483B2

(12) United States Patent
Razavi Majomard et al.

(10) Patent No.: US 11,843,483 B2
(45) Date of Patent: Dec. 12, 2023

(54) METHOD AND APPARATUS FOR TRAINING A FULL-DUPLEX COMMUNICATION LINK

(71) Applicant: Marvell Asia Pte Ltd, Singapore (SG)

(72) Inventors: Seid Alireza Razavi Majomard, Belmont, CA (US); Sina Barkeshli, Saratoga, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/589,325

(22) Filed: Jan. 31, 2022

(65) Prior Publication Data

US 2022/0247603 A1 Aug. 4, 2022

Related U.S. Application Data

(60) Provisional application No. 63/143,618, filed on Jan. 29, 2021.

(51) Int. Cl.
*H04L 25/03* (2006.01)
*H04L 5/00* (2006.01)
(Continued)

(52) U.S. Cl.
CPC ....... *H04L 25/03006* (2013.01); *H04B 3/237* (2013.01); *H04B 3/238* (2013.01);
(Continued)

(58) Field of Classification Search
CPC . H04B 3/20; H04B 3/23; H04B 3/231; H04B 3/237; H04B 3/238; H04B 3/32;
(Continued)

(56) References Cited

U.S. PATENT DOCUMENTS 5,917,853 A * 6/1999 Greenblatt ............ H04L 5/1438
375/377
6,628,704 B1 9/2003 Long et al.
(Continued)

FOREIGN PATENT DOCUMENTS

CN 105453501 B * 2/2019 ............. H04B 3/487

OTHER PUBLICATIONS

IEEE Std 802.3ch-2020 "IEEE Standard for Ethernet—Amendment 8: Physical Layer Specifications and Management Parameters for 2.5 Gb/s, 5 Gb/s, and 10 Gb/s Automotive Electrical Ethernet," IEEE Computer Society, pp. 1-207 (Jun. 30, 2020).
(Continued)

*Primary Examiner* — Young T. Tse

(57) ABSTRACT

During a training procedure for communicating via a full-duplex communication link, a first communication device receives training information from a second communication device. The training information corresponds to first signal processing parameters developed at the second communication device for use by the second communication device to process signals received by the second communication device via the full-duplex communication link. After receiving the training information from the second communication device, the first communication device develops second signal processing parameters to be used by the first communication device to process signals received by the first communication device via the full-duplex communication link. The second signal processing parameters are developed using the training information received from the second communication device.

27 Claims, 4 Drawing Sheets

(51) Int. Cl.
*H04L 5/14* (2006.01)
*H04B 3/23* (2006.01)

(52) U.S. Cl.
CPC .............. *H04L 5/0062* (2013.01); *H04L 5/14* (2013.01); *H04L 2025/0377* (2013.01); *H04L 2025/03815* (2013.01)

(58) Field of Classification Search
CPC ... H04L 5/0062; H04L 5/14; H04L 25/03006; H04L 2025/03815
USPC ........ 375/219, 220, 222, 257; 370/286, 289, 370/290, 292; 379/406.01, 406.05, 379/406.08, 406.1
See application file for complete search history.

(56) References Cited

U.S. PATENT DOCUMENTS

| | | | |
|---|---|---|---|
| 6,876,696 B1* | 4/2005 | Goodson | H04L 5/1438 375/219 |
| 6,975,677 B2 | 12/2005 | Matsumoto | |
| 7,826,609 B1 | 11/2010 | Kim | |
| 10,097,237 B1* | 10/2018 | Sedarat | H04B 3/32 |
| 11,516,038 B1* | 11/2022 | Sedarat | H04L 12/1895 |
| 2009/0097393 A1* | 4/2009 | Diab | H04L 12/413 370/465 |
| 2009/0097500 A1* | 4/2009 | Diab | H04L 5/0007 370/464 |
| 2013/0215951 A1 | 8/2013 | Nuzman | |
| 2019/0036559 A1* | 1/2019 | Wu | H04J 11/0023 |

OTHER PUBLICATIONS

International Search Report and Written Opinion for Application No. PCT/US2022/014561, dated Apr. 28, 2022. (12 pages).

\* cited by examiner

METHOD AND APPARATUS FOR TRAINING A FULL-DUPLEX COMMUNICATION LINK

CROSS REFERENCES TO RELATED APPLICATIONS

This application claims the benefit of U.S. Provisional Patent Application No. 63/143,618, entitled "Deep Collaboration Between Two Sides of a Full-Duplex Communication Link," filed on Jan. 29, 2021, which is hereby incorporated herein by reference in its entirety for all purposes.

FIELD OF TECHNOLOGY

The present disclosure relates generally to communication networks, and more particularly to training communication devices to communicate via a full-duplex communication link.

BACKGROUND

Communication devices communicating via a full-duplex communication link typically exchange training signals to facilitate the adaptation of signal processing components at the communication devices. For example, with a full-duplex communication link corresponding to multiple twisted copper wire pairs, communication devices typically exchange known training signals during a training procedure in which signal processing components that perform functions such as equalization, echo cancellation, near-end crosstalk (NEXT) cancellation, far-end crosstalk (FEXT) cancellation, etc., are adapted.

The transmission of training signals and the adaptation of the signal processing components often precludes the transmission of user information at the same time. Thus, such training procedures typically increase latency with respect to the transmission of user information, at least in the short term. Additionally, the transmission of training signals and the adaptation of signal processing components consume power that is not directly used in the transmission of user information.

SUMMARY

In an embodiment, a method for training communication devices for communicating via a full-duplex communication link includes: during a training procedure for communicating via the full-duplex communication link, receiving, at a first communication device, training information from a second communication device, the training information corresponding to first signal processing parameters developed at the second communication device for use by the second communication device to process signals received by the second communication device via the full-duplex communication link; and after receiving the training information, developing, at the first communication device, second signal processing parameters to be used by the first communication device to process signals received by the first communication device via the full-duplex communication, the second signal processing parameters being developed using the training information, received from the second communication device, that corresponds to the first signal processing parameters developed by the second communication device for use by the second communication device when the second communication device processes signals received by the second communication device.

In another embodiment, a first communication device comprises: a transceiver configured to communicate via a full-duplex communication link; a controller configured to: receive, during a training procedure for communicating via the full-duplex communication link, training information from a second communication device, the training information corresponding to first signal processing parameters developed at the second communication device for use by the second communication device to process signals received by the second communication device via the full-duplex communication link, and use the training information to determine initial values of at least some second signal processing parameters for use by one or more signal processors of the first communication device; and the one or more signal processors of the first communication device being configured to: adapt the at least some second signal processing parameters from the initial values, the initial values having been determined using the training information received from the second communication device, and process signals received via the full-duplex communication link based on adapted second signal processing parameters.

In yet another embodiment, another method for training communication devices for communicating via a full-duplex communication link includes: during a first portion of a training procedure for communicating via the full-duplex communication link, developing, at a first communication device, first signal processing parameters to be used by the first communication device to process signals received by the first communication device via the full-duplex communication link; and transmitting, by the first communication device to a second communication device, training information corresponding to the first signal processing parameters, the training information transmitted by the first communication device to be used by the second communication in a second portion of the training procedure to develop second signal processing parameters to be used by the second communication device when communicating with the first communication device via the full-duplex communication link.

In still another embodiment, another first communication device comprises: a transceiver configured to communicate via a full-duplex communication link; one or more signal processors configured to: develop, during a first portion of a training procedure for communicating via the full-duplex communication link, first signal processing parameters to be used by the one or more signal processors to process signals received by the first communication device via the full-duplex communication link; and a controller configured to: determine training information corresponding to the first signal processing parameters, and control the transceiver to transmit the training information to the second communication device, the training information transmitted by the first communication device to be used by the second communication device in a second portion of the training procedure to develop second signal processing parameters to be used by the second communication device when communicating with the first communication device via the full-duplex communication link.

DETAILED DESCRIPTION

In embodiments described below, a first communication device develops first signal processing parameters during a first portion of a training procedure, and sends training information, which correspond to the first signal processing parameters, to a second communication device. The second communication device uses the training information in a second portion of the training procedure to develop second signal processing parameters. In some embodiments, the training information corresponds to initial values of the second signal processing parameters, and the second communication device sets the second signal processing parameters to the initial values and then adapts the second signal processing parameters in the second portion of the training procedure. In some embodiments, use of the training information allows the second communication device to adapt the second signal processing parameters more quickly (as compared to adapting the second signal processing parameters without knowledge of the training information from the first communication device), thus reducing a time duration of the second portion of the training procedure. For example, because the second signal processing parameters are initialized more closely to the ultimate converged values (as opposed to starting from arbitrary values), the time duration for adaptation is reduced. In some embodiments, reducing the time duration of the second portion of the training procedure reduces power consumed by the second communication device (and optionally the first communication device).

In some embodiments, use of the training information by the second communication device additionally or alternatively permits a reduction in complexity of signal processing components of the second communication device (as compared to signal processing components that must support the adaptation of the second signal processing parameters without knowledge of the training information from the first communication device).

Figure 1:
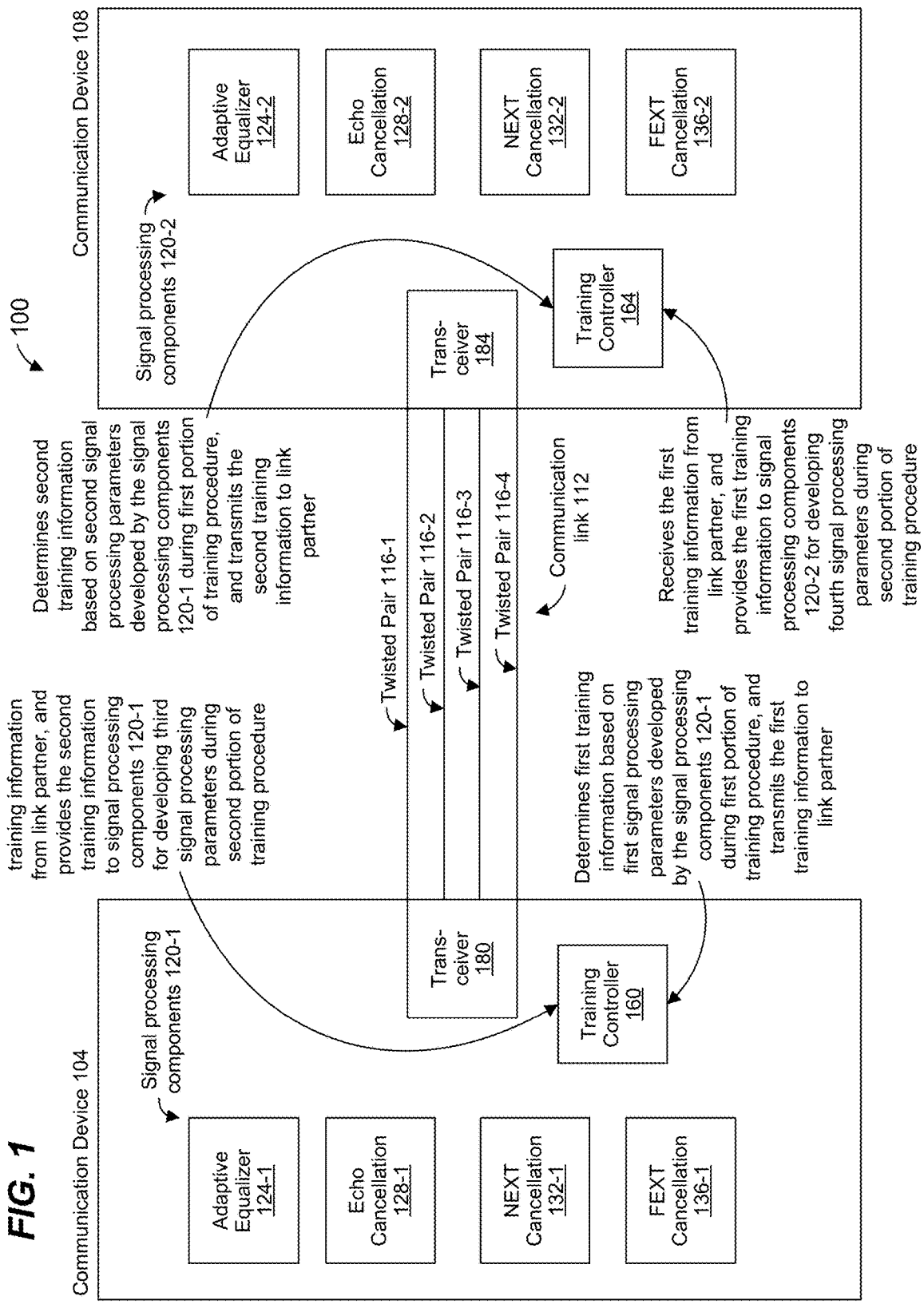
FIG. 1 is a simplified diagram of an example communication system in which a first communication device develops first signal processing parameters during a training procedure, and then sends to a second communication device training information corresponding to the first signal processing parameters, where the training information is for assisting the second communication device to develop second signal processing parameters during the training procedure, according to an embodiment.

FIG. 1 is a simplified diagram of an example communication system 100, according to an embodiment. The communication system 100 includes a communication device 104 communicatively coupled to a communication device 108 via a full-duplex communication link 112. In an embodiment, the full-duplex communication link 112 comprises one or more twisted copper wire pairs 116 ("twisted pairs 116"). In other embodiments, the full-duplex communication link 112 comprises another suitable communication medium such as coaxial cable, an optical cable, a wireless communication link, etc. Although four twisted pairs 116 are illustrated in FIG. 1, in other embodiments the communication link 112 comprises a different suitable number of twisted pairs 116, such as one, two, three, five, six, seven, etc.

The communication device 104 comprises a plurality of signal processing components 120-1, including an adaptive equalizer 124-1, an echo canceller 128-1, a near-end crosstalk (NEXT) canceller 132-1, and a far-end crosstalk (FEXT) canceller 136-1. In other embodiments, the plurality of signal processing components 120-1 further includes one or more additional signal processing components not shown in FIG. 1 (e.g., an interference canceller, a beamforming controller, etc.), and/or one or more of the signal processing components illustrated in FIG. 1 are omitted from the plurality of signal processing components 120-1.

The adaptive equalizer 124-1 is configured to process a received signal that was received from the communication device 108 via the full-duplex communication link 112. In some embodiments, the adaptive equalizer 124-1 is configured to counteract frequency attenuation and/or phase delay caused by a communication channel between the communication device 104 and the communication device 108. In some embodiments, the adaptive equalizer 124-1 comprises one or both of i) a feed forward equalizer (FFE), and ii) a decision feedback equalizer (DFE). In other embodiments, the adaptive equalizer 124-1 additionally or alternatively comprises one or more other suitable equalizers different than an FFE and a DFE. In some embodiments in which the adaptive equalizer 124-1 comprises an FFE, the FFE comprises analog equalizer circuitry that processes a received signal (an "analog received signal") prior to digitization of the received signal by an analog-to-digital converter (ADC), which is not shown in FIG. 1. In other embodiments in which the adaptive equalizer 124-1 comprises an FFE, the FFE comprises digital equalizer circuitry that processes the received signal (a "digital received signal") after digitization by the ADC (not shown).

The adaptive equalizer 124-1 comprises a plurality of taps that correspond to different versions of the received signal (e.g., delayed versions of the received signal). In some embodiments, the adaptive equalizer 124-1 comprises a plurality of delay elements, and each of at least some taps correspond to an output of a respective delay element. In some embodiments, each tap comprises a respective multiplier configured to multiply the respective version of the received signal with a respective equalizer coefficient to generate a respective weighted version of the received signal. A summer adds the weighted versions together to generate an equalized signal. As will be described further below, the equalizer coefficients are adapted during a training procedure in which the communication device 108 transmits known training signals.

The echo canceller 128-1 is configured to process the received signal to reduce received echoes of a transmit signal transmitted by the communication device 104 to the communication device 108 via the full-duplex communication link 112. For example, when the communication device 104 transmits via the full-duplex communication link 112, echoes may be received by the communication device 104 as a result of impedance discontinuities in the path from the communication device 104 to the communication device 108, such as due to a connection between an integrated circuit (IC) chip and a printed circuit board (PCB) corresponding to the communication device 104, a connection between the PCB and a cable, cable connectors coupled to a cable of the full-duplex communication link 112, damage to cables, imperfections in cables, etc. The echo canceller 128-1 is configured to generate a recreated echo signal using the transmit signal, and to subtract the recreated echo signal from the received signal, according to an embodiment.

According to some embodiments, the echo canceller 128-1 comprises a plurality of taps that correspond to different versions of the transmit signal (e.g., delayed versions of the transmit signal). In some embodiments, the echo canceller 128-1 comprises a plurality of delay elements, and each of at least some taps correspond to an output of a respective delay element. In some embodiments, each tap comprises a respective multiplier configured to multiply the respective version of the transmit signal with a respective echo cancellation coefficient to generate a respective weighted version of the transmit signal. A summer adds the weighted versions together to generate the recreated echo signal. As will be described further below, the echo cancellation coefficients are adapted during a training procedure in which the communication device 104 transmits known training signals.

In some embodiments, respective taps of the echo canceller 128-1 correspond to respective time delays, which correspond to respective points (or segments) along the communication path between the communication device 104 and the communication 108. Because one or more significant portions of the path typically have no significant impedance discontinuities (e.g., a portion corresponding to a cable segment), taps of the echo canceller 128-1 are not needed for those portions of the path. Thus, in some embodiments, the echo canceller 128-1 uses taps only for portions of the communication path that are sources of echo. In some embodiments, the echo canceller 128-1 comprises "rover segments" having programmable delay lines, which can be configured to correspond to different portions of the communication path by programming the delay lines to implement different length delays. In embodiments that use rover segments, the rover segments are configured during a training procedure discussed further below.

In embodiments in which the full-duplex communication link 112 comprises multiple twisted pairs 116, the NEXT canceller 132-1 is configured to process each signal received via a respective twisted pair 116 to reduce NEXT caused by signal(s) transmitted by the communication device 104 via other twisted wire pair(s) 116. The NEXT canceller 132-1 is configured to generate, for each signal received via a respective twisted pair 116, a recreated NEXT signal using the signals transmitted by the communication device 104 in the other twisted wire pair(s) 116, and to subtract the recreated NEXT signal from the received signal from the respective twisted pair 116.

According to some embodiments, the NEXT canceller 132-1 comprises a plurality of taps that correspond to different sets of two twisted pairs 116 and to different time delays. In some embodiments, each tap comprises a respective multiplier configured to multiply a respective delayed version of a transmit signal in a respective twisted pair 116 with a respective NEXT cancellation coefficient to generate a respective weighted transmit signal. For each twisted pair 116, a summer adds the weighted transmit signals together to generate the recreated NEXT signal, and the recreated NEXT signal is subtracted from the received signal in the twisted pair 116, according to an embodiment. As will be described further below, the NEXT cancellation coefficients are adapted during a training procedure in which the communication device 104 transmits known training signals.

As discussed above, some taps of the NEXT canceller 132-1 correspond to respective time delays, which correspond to respective points (or segments) along the communication path between the communication device 104 and the communication 108, according to some embodiments. Similar to the echo canceller 128-1, because one or more significant portions of the path typically are not significant sources of NEXT, taps of the NEXT canceller 132-1 are not needed for those portions of the path. Thus, in some embodiments, the NEXT canceller 132-1 uses taps only for portions of the communication path that experience echo. In some embodiments, the NEXT canceller 132-1 comprises "rover segments" having programmable delay lines, which can be configured to correspond to different portions of the communication path by programming the delay lines to implement different delay lengths. In embodiments that use rover segments, the rover segments are configured during a training procedure discussed further below.

In embodiments in which the full-duplex communication link 112 comprises multiple twisted pairs 116, the FEXT canceller 136-1 is configured to process each signal received via a respective twisted pair 116 to reduce FEXT caused by signal(s) transmitted by the communication device 108 in other twisted wire pair(s) 116. The FEXT canceller 136-1 is configured to generate, for each signal received via a respective twisted pair 116, a recreated FEXT signal using the signals received in the other twisted wire pair(s) 116, and to subtract the recreated FEXT signal from the received signal in the respective twisted pair 116.

According to some embodiments, the FEXT canceller 136-1 comprises a plurality of taps that correspond to different sets of two twisted pairs 116. In some embodiments, each tap comprises a respective multiplier configured to multiply a respective receive signal in a respective twisted pair 116 with a respective FEXT cancellation coefficient to generate a respective weighted receive signal. For each twisted pair 116, a summer adds the weighted receive signals together to generate the recreated FEXT signal, and the recreated FEXT signal is subtracted from the received signal in the twisted pair 116. As will be described further below, the FEXT cancellation coefficients are adapted during a training procedure in which the communication device 104 receives known training signals.

In some embodiments, the echo canceller 128-1 and the NEXT canceller 132-1 are combined in a unitary echo/NEXT canceller that is configured to process the received signal to reduce both echoes and NEXT described above. In such embodiments, parameters used by the unitary echo/NEXT canceller are adapted during a training procedure in which the communication device 104 transmits known training signals.

The communication device 108 comprises a plurality of signal processing components 120-2, including an adaptive equalizer 124-2, an echo canceller 128-2, a NEXT canceller 132-2, and a FEXT canceller 136-2. In other embodiments, the plurality of signal processing components 120-2 further includes one or more additional signal processing components not shown in FIG. 1 (e.g., an interference canceller, a beamforming controller, etc.), and/or one or more of the signal processing components illustrated in FIG. 1 are omitted from the plurality of signal processing components 120-2.

The adaptive equalizer 124-2, the echo canceller 128-2, the NEXT canceller 132-2, and the FEXT canceller 136-2 of the communication device 108 generally operate in the same or a similar manner as the adaptive equalizer 124-1, the echo canceller 128-1, the NEXT canceller 132-1, and the FEXT canceller 136-1, respectively, of the communication device 104.

As discussed above, the signal processing components 120 use signal processing parameters, such as coefficients, programmable delays, etc., to process signals received via the full-duplex communication link 112, and such signal processing parameters are adapted during a training procedure.

Figure 2:
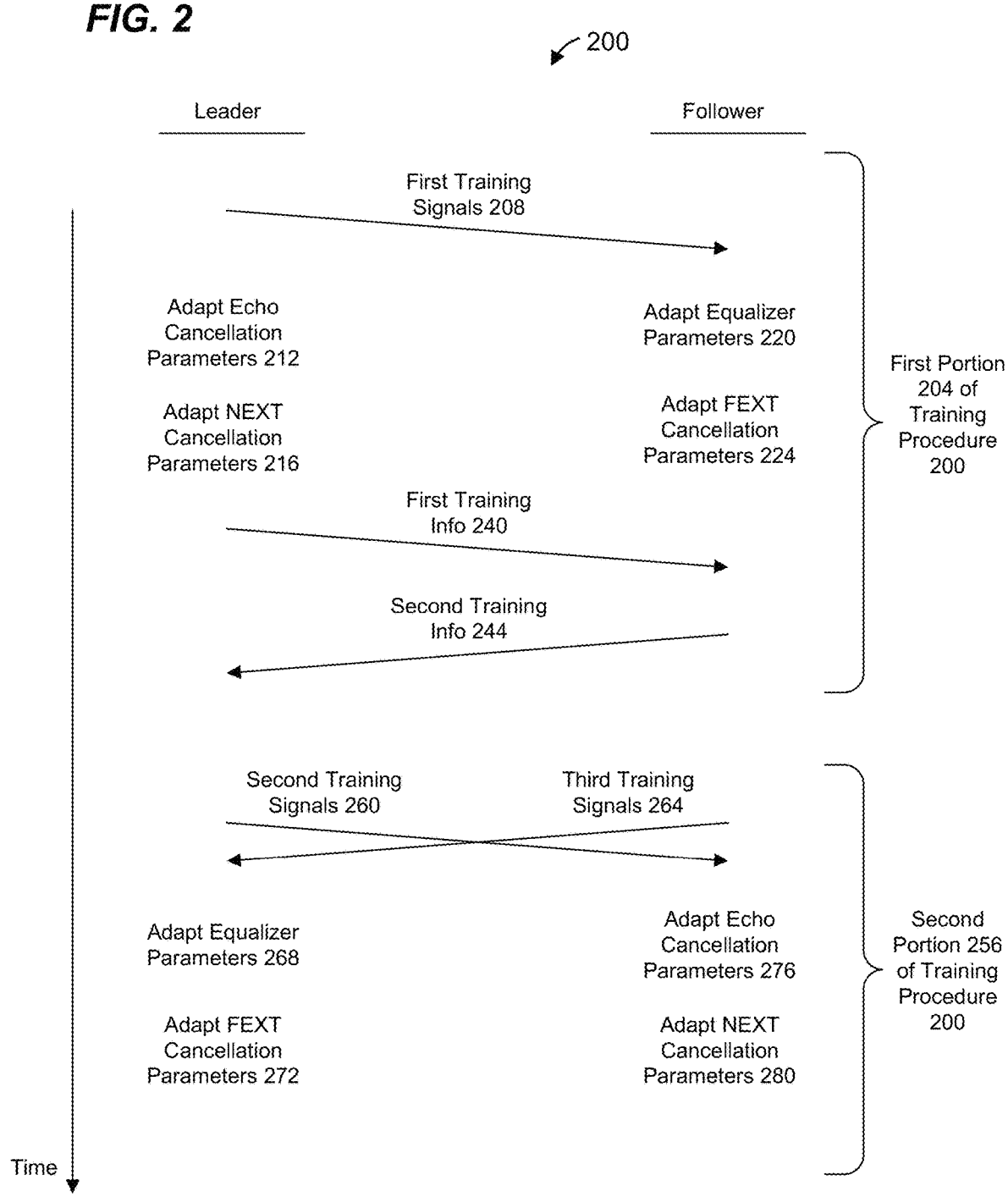
FIG. 2 is a simplified timing diagram of an example training procedure implemented by the example communication system of FIG. 1, according to an embodiment.

FIG. 2 is a simplified timing diagram of an example training procedure 200 that is performed by the communication device 104 and the communication device 108 of FIG. 1, according to an embodiment, and FIG. 2 is described with reference to FIG. 1 for explanatory purposes. In other embodiments, the training procedure 200 is performed by one or more suitable communication devices different than the communication device 104 and/or the communication device 108. Similarly, the communication device 104 and the communication device 108 perform a suitable training procedure different than the training procedure 200, according to some embodiments.

In the time diagram of FIG. 2, time generally increases from the top of the figure to the bottom of the figure. Additionally, actions performed by a communication device operating in a leader role are shown on the left-hand side of the figure, whereas actions performed by a communication device operating in a follower role are shown on the right-hand side of the figure. With reference to FIG. 1, the communication device 104 is sometimes described as acting in the role of the leader and the communication device 108 is sometimes described as acting in the role of the follower.

In a first portion 204 of the training procedure 200, the leader (e.g., the communication device 104) transmits first training signals 208 to the follower (e.g., the communication device 108) via the full-duplex communication link 112. Based on the transmission of the first training signals 208, the leader adapts first signal processing parameters that will be used by the leader to process signals received at the leader via the full-duplex communication link 112. For example, in some embodiments, the leader (e.g., the communication device 104) adapts 212 echo cancellation parameters (e.g., coefficients and/or programmable delay lines) based on the transmission of the first training signals 208 by the leader. For instance, echo signals received by the leader based on the first training signals 208 are used to adapt the echo cancellation coefficients and/or programmable delay lines.

In some embodiments, the leader (e.g., the communication device 104) additionally or alternatively adapts 216 NEXT cancellation parameters (e.g., coefficients and/or programmable delay lines) based on the transmission of the first training signals 208 by the leader. For instance, NEXT signals received by the leader based on the first training signals 208 are used to adapt the NEXT cancellation coefficients and/or programmable delay lines.

In some embodiments in which the echo canceller 128-1 and the NEXT canceller 132-1 are combined in a unitary echo/NEXT canceller, parameters (e.g., coefficients and/or programmable delay lines) of the unitary echo/NEXT canceller are adapted based on the transmission of the first training signals 208 by the leader. For instance, NEXT and echo signals received by the leader based on the first training signals 208 are used to adapt the coefficients and/or programmable delay lines of the unitary echo/NEXT canceller.

Additionally, based on the reception of the first training signals 208 at the follower (e.g., the communication device 108), the follower adapts second signal processing parameters that will be used by the follower to process signals received at the follower via the full-duplex communication link 112. For example, in some embodiments, the follower (e.g., the communication device 108) adapts 220 equalizer parameters based on the reception of the first training signals 208 at the follower. For instance, reception of the first training signals 208 is used to adapt coefficients of the equalizer 124-2.

In some embodiments in which the full-duplex communication link 112 comprises multiple twisted pairs 116, the follower (e.g., the communication device 108) additionally or alternatively adapts 224 FEXT cancellation parameters (e.g., FEXT cancellation coefficients) based on the reception of the first training signals 208 at the follower. For instance, reception of FEXT signals corresponding to the first training signals 208 is used to adapt coefficients of the FEXT canceller 136-2.

Although adaptation 216 of the NEXT cancellation parameters is depicted in FIG. 2 as occurring after adaptation 212 of the echo cancellation parameters, in some embodiments adaptation 216 of the NEXT cancellation coefficients occurs before adaptation 212 of the echo cancellation parameters, or adaptation 216 of the NEXT cancellation parameters overlaps in time with adaptation 212 of the echo cancellation parameters.

Similarly, although adaptation 224 of the FEXT cancellation parameters is depicted in FIG. 2 as occurring after adaptation 220 of the equalizer parameters, in some embodiments adaptation 224 of the FEXT cancellation parameters occurs before adaptation 220 of the equalizer parameters, or adaptation 224 of the FEXT cancellation parameters overlaps in time with adaptation 220 of the equalizer parameters.

Although adaptation 212 of the echo cancellation parameters and adaptation 216 of the NEXT cancellation parameters is depicted in FIG. 2 as occurring after an end of transmission of the first training signals 208, in some embodiments adaptation 212 of the echo cancellation parameters and/or adaptation 216 of the NEXT cancellation parameters overlaps in time with transmission of the first training signals 208.

Similarly, although adaptation 220 of the equalizer parameters and adaptation 224 of the FEXT cancellation parameters is depicted in FIG. 2 as occurring after an end of transmission of the first training signals 208, in some embodiments adaptation 220 of the equalizer parameters and/or adaptation 224 of the FEXT cancellation parameters overlaps in time with transmission of the first training signals 208.

Referring again to echo cancellation and NEXT cancellation, points (or segments) along the communication path between the leader and the follower that correspond to sources of echo and/or NEXT from the standpoint of the leader typically are also sources of echo and/or NEXT from the standpoint of the follower. Thus, the parameters developed by the leader during the first portion 204 of the training procedure 200 for echo and/or NEXT cancellation are useful to the follower for adapting parameters of the echo canceller 128-2 and/or the NEXT canceller 132-2 (or a unitary echo/NEXT canceller) of the follower. For example, the parameters (e.g., coefficients and/or programmable delays) developed by the leader during the first portion 204 can be used to determine initial values of parameters (e.g., coefficients and/or programmable delays) of the echo canceller 128-2 and/or the NEXT canceller 132-2 (or a unitary echo/NEXT canceller) of the follower, and thus significantly reduce time needed to adapt the parameters (e.g., coefficients and/or programmable delays) of the echo canceller 128-2 and/or of the NEXT canceller 132-2 (or a unitary echo/NEXT canceller) of the follower, according to some embodiments. Reducing time needed to adapt the parameters (e.g., coefficients and/or programmable delays) of the echo canceller 128-2 and/or the NEXT canceller 132-2 (or a unitary echo/NEXT canceller) of the follower reduces power consumed by the follower during the training procedure as compared to when the follower has no knowledge of the coefficients/programmable time delays developed at the leader, at least in some embodiments.

In embodiments in which the echo canceller 128-2 and/or the NEXT canceller 132-2 (or a unitary echo/NEXT canceller) of the follower utilize "roving segments", programmable delays developed by the leader during the first portion 204 are used to determine initial time delay positions of roving segments of the follower, which allows the follower to use fewer roving segments during training as compared to when the follower has no knowledge of the programmable time delays developed at the leader, according to some embodiments. Using fewer roving segments during training reduces power consumed during the training as compared to when the follower has no knowledge of the programmable time delays developed at the leader, at least in some embodiments. Permitting the follower to use fewer roving segments during training also permits the follower to be designed with fewer roving segments as compared to communication devices that do not use knowledge of the programmable time delays developed at the leader, thus reducing complexity and/or cost of the follower, according to some embodiments.

Thus, in some embodiments, signal processing parameters (e.g., coefficients and/or programmable delays of an echo canceller, coefficients and/or programmable delays of a NEXT canceller, coefficients and/or programmable delays of a unitary echo/NEXT canceller, etc.) developed by the leader for processing signals received by the leader are useful for developing signal processing parameters (e.g., coefficients and/or programmable delays of an echo canceller, coefficients and/or programmable delays of a NEXT canceller, coefficients and/or programmable delays of a unitary echo/NEXT canceller, etc.) at the follower for use by the follower for processing signals received by the follower.

Accordingly, the leader generates first training information 240 corresponding to signal processing parameters (e.g., coefficients and/or programmable delays of an echo canceller, coefficients and/or programmable delays of a NEXT canceller, coefficients and/or programmable delays of a unitary echo/NEXT canceller, etc.) developed by the leader for processing signals received by the leader, and transmits the first training information 240 to the follower for use by the follower to develop signal processing parameters (e.g., coefficients and/or programmable delays of an echo canceller, coefficients and/or programmable delays of a NEXT canceller, coefficients and/or programmable delays of a unitary echo/NEXT canceller, etc.) at the follower for use by the follower for processing signals received by the follower.

In some embodiments, the first training information 240 comprises coefficient information corresponding to coefficients (e.g., coefficients of an echo canceller, coefficients of a NEXT canceller, coefficients of a unitary echo/NEXT canceller, etc.) developed by the leader for processing signals received by the leader. The coefficient information comprises at least some of the coefficients developed by the leader, compressed versions of at least some of the coefficients developed by the leader (e.g., a subset of the coefficients, quantized coefficients, one or more codebook indices corresponding to coefficient values, etc.), etc., according to various embodiments. In some embodiments, the leader calculates, using the coefficients developed by the leader for use by the leader, coefficients to be used by the follower, and the first training information 240 comprises coefficient information corresponding to coefficients to be used by the follower.

In some embodiments, the first training information 240 comprises programmable delay information corresponding to programmable delays developed by the leader for processing signals received by the leader. The programmable delay information comprises at least some programmable delays developed by the leader, compressed versions of at least some programmable delay developed by the leader (e.g., quantized values corresponding to programmable delay values, one or more codebook indices corresponding to programmable delay values, etc.), etc., according to various embodiments. In some embodiments, the leader calculates, using the programmable delays developed by the leader for use by the leader, programmable delays to be used by the follower, and the first training information 240 comprises programmable delay information corresponding to programmable delays to be used by the follower.

As discussed above, the follower adapts 220 equalizer parameters (e.g., coefficients) that are to be used by the follower. Typically, the equalizer coefficients that are subsequently adapted by the leader are significantly correlated with the equalizer coefficients that were adapted by the follower, and the equalizer coefficients that are adapted (220) by the follower would provide a good starting point for adaptation of the equalizer coefficients at the leader (e.g., use of the equalizer coefficients adapted (220) by the follower as initial values would significantly reduce time required to adapt the equalizer coefficients at the leader).

Similarly, FEXT cancellation parameters (e.g., coefficients) that are subsequently adapted by the leader are significantly correlated with the FEXT cancellation coefficients that were adapted by the follower, and the FEXT cancellation coefficients that are adapted (224) by the follower would provide a good starting point for adaptation of the FEXT cancellation coefficients at the leader (e.g., use of the FEXT cancellation coefficients adapted (224) by the follower as initial values would significantly reduce time required to adapt the FEXT cancellation coefficients at the leader). With cables having multiple twisted pairs, for example, FEXT is typically a function of twist ratios between an attacker twisted pair and a victim twisted pair. For instance, twisted pairs with similar twist ratios cause more FEXT between each other as compared to twisted pairs with more dissimilar twist ratios. Additionally, the FEXT power from a first twisted pair to a second twisted pair is similar to the FEXT power from the second twisted pair to the first twisted pair.

Thus, in some embodiments, signal processing parameters (e.g., coefficients of an equalizer, coefficients of a FEXT canceller, etc.) developed by the follower for processing signals received by the follower are useful for developing signal processing parameters (e.g., coefficients of an equalizer, coefficients of a FEXT canceller, etc.) at the leader for use by the leader for processing signals received by the leader.

Accordingly, the follower generates second training information 244 corresponding to signal processing parameters (e.g., parameters (e.g., coefficients) of an equalizer, parameters (e.g., coefficients) of a FEXT canceller, etc.) developed by the follower for processing signals received by the follower, and transmits the second training information 244 to the leader for use by the leader to develop signal processing parameters (e.g., parameters (e.g., coefficients) of an equalizer, parameters (e.g., coefficients) of a FEXT canceller, etc.) at the leader for use by the leader for processing signals received by the leader.

In some embodiments, the second training information 244 comprises coefficient information corresponding to coefficients (e.g., coefficients of an equalizer, coefficients of a FEXT canceller, etc.) developed by the follower for processing signals received by the follower. The coefficient information comprises at least some of the coefficients developed by the follower, compressed versions of at least some of the coefficients developed by the follower (e.g., a subset of the coefficients, quantized coefficients, one or more codebook indices corresponding to coefficient values, etc.), etc., according to various embodiments. In some embodiments, the follower calculates, using the coefficients developed by the follower for use by the follower, coefficients to be used by the leader, and the second training information 244 comprises coefficient information corresponding to coefficients to be used by the leader.

During a second portion 256 of the training procedure 200, the leader transmits second training signals 260 to the follower, and the follower transmits third training signals 264 to the leader. Although FIG. 2 illustrates the second training signals 260 and the third training signals 264 being transmitted simultaneously, in other embodiments transmission of the second training signals 260 and transmission of the third training signals 264 overlaps only partially in time. In other embodiments, transmission of the second training signals 260 does not overlap in time with transmission of the third training signals 264.

Based on reception of the third training signals 264, the leader adapts third signal processing parameters that will be used by the leader to process signals received from the follower at the leader via the full-duplex communication link 112. For example, in some embodiments, the leader (e.g., the communication device 104) adapts 268 parameters (e.g., coefficients) of an equalizer (e.g., the adaptive equalizer 124-1) based on the reception of the third training signals 264. As another example, in some embodiments, the leader (e.g., the communication device 104) adapts 272 parameters (e.g., coefficients) of a FEXT canceller (e.g., the FEXT canceller 136-2) based on the reception of the third training signals 264.

In some embodiments, adapting 268 parameters of the equalizer of the leader comprises determining initial values of at least some of the parameters using the second training information 244 received from the follower. For example, the leader uses the second training information 244 to determine initial values of at least some equalizer coefficients; sets the at least some equalizer coefficients to the determined initial values; and then uses reception of the third training signals 264 to adapt the equalizer coefficients.

In some embodiments in which the full-duplex communication link 112 comprises multiple twisted pairs 116, the leader (e.g., the communication device 104) additionally or alternatively adapts 272 FEXT cancellation parameters (e.g., coefficients) based on the reception of the third training signals 264. For instance, reception of FEXT signals corresponding to the third training signals 264 is used to adapt the FEXT cancellation coefficients.

In some embodiments, adapting 272 FEXT cancellation parameters of the leader comprises determining initial values of at least some of the FEXT cancellation parameters using the second training information 244 received from the follower. For example, the leader uses the second training information 244 to determine initial values of at least some FEXT cancellation coefficients; sets the at least some FEXT cancellation coefficients to the determined initial values; and uses reception of the third training signals 264 to adapt the FEXT cancellation coefficients.

Additionally, based on the transmission of the third training signals 264 by the follower (e.g., the communication device 108), the follower adapts fourth signal processing parameters that will be used by the follower to process signals received from the leader at the follower via the full-duplex communication link 112. For example, in some embodiments, the follower (e.g., the communication device 108) adapts 276 echo cancellation parameters based on the reception of echo signals corresponding to the third training signals 264. As another example, in some embodiments, the follower (e.g., the communication device 108) adapts 280 NEXT cancellation parameters based on the reception of NEXT signals corresponding to the third training signals 264.

In some embodiments, adapting 276 echo cancellation parameters of the follower comprises determining initial values of at least some of the echo cancellation parameters using the first training information 240 received from the leader. For example, the leader uses the first training information 240 to determine initial values of at least some echo cancellation parameters (e.g., coefficients and/or programmable delays); sets the at least some echo cancellation parameters to the determined initial values; and uses reception of echo signals corresponding to the third training signals 264 to adapt the echo cancellation parameters (e.g., coefficients and/or programmable delays).

In some embodiments, the follower (e.g., the communication device 108) additionally or alternatively adapts 280 NEXT cancellation parameters (e.g., coefficients and/or programmable delay lines) based on the transmission of the third training signals 264 by the follower. For instance, NEXT signals received by the follower based on the third training signals 264 are used to adapt the NEXT cancellation coefficients and/or programmable delay lines.

In some embodiments, adapting 280 NEXT cancellation parameters of the follower comprises determining initial values of at least some of the NEXT cancellation parameters using the first training information 240 received from the leader. For example, the leader uses the first training information 240 to determine initial values of at least some NEXT cancellation parameters (e.g., coefficients and/or programmable delays); sets the at least some NEXT cancellation parameters to the determined initial values; and uses reception of NEXT signals corresponding to the third training signals 264 to adapt the NEXT cancellation parameters (e.g., coefficients and/or programmable delays).

In some embodiments in which the echo canceller 128-2 and the NEXT canceller 132-2 are combined in a unitary echo/NEXT canceller, parameters (e.g., coefficients and/or programmable delay lines) of the unitary echo/NEXT canceller are adapted based on the transmission of the third training signals 264 by the follower. For instance, NEXT and echo signals received by the leader based on the third training signals 264 are used to adapt the coefficients and/or programmable delay lines of the unitary echo/NEXT canceller. In some embodiments, adapting parameters of the unitary echo/NEXT canceller of the follower comprises determining initial values of at least some of the unitary echo/NEXT cancellation parameters using the first training information 240 received from the leader. For example, the leader uses the first training information 240 to determine initial values of at least some unitary echo/NEXT cancellation parameters (e.g., coefficients and/or programmable delays); sets the at least some unitary echo/NEXT cancellation parameters to the determined initial values; and uses reception of echo and NEXT signals corresponding to the third training signals 264 to adapt the unitary echo/NEXT cancellation parameters (e.g., coefficients and/or programmable delays).

Although adaptation 272 of the FEXT cancellation parameters is depicted in FIG. 2 as occurring after adaptation 268 of the equalizer parameters, in some embodiments adaptation 272 of the FEXT cancellation parameters occurs before adaptation 268 of the equalizer parameters, or adaptation 272 of the FEXT cancellation parameters overlaps in time with adaptation 268 of the equalizer parameters.

Similarly, although adaptation 280 of the NEXT cancellation parameters is depicted in FIG. 2 as occurring after adaptation 276 of the echo cancellation parameters, in some embodiments adaptation 280 of the NEXT cancellation parameters occurs before adaptation 276 of the echo cancellation parameters, or adaptation 280 of the NEXT cancellation parameters overlaps in time with adaptation 276 of the echo cancellation parameters.

Although adaptation 268 of the equalizer parameters and adaptation 272 of the FEXT cancellation parameters are depicted in FIG. 2 as occurring after an end of transmission of the third training signals 264, in some embodiments adaptation 268 of the equalizer parameters and adaptation 272 of the FEXT cancellation parameters overlaps in time with transmission of the third training signals 264.

Similarly, although adaptation 276 of the echo cancellation parameters and adaptation 280 of the NEXT cancellation parameters is depicted in FIG. 2 as occurring after an end of transmission of the third training signals 264, in some embodiments adaptation 276 of the echo cancellation parameters and/or adaptation 280 of the NEXT cancellation parameters overlaps in time with transmission of the third training signals 264.

In some embodiments, the follower further adapts equalizer parameters and/or FEXT cancellation parameters using reception of the second training signals 260.

In some embodiments, the leader further adapts echo cancellation parameters and/or NEXT cancellation parameters based on reception of echo signals and/or NEXT signals corresponding to the second training signals 260.

Referring now to FIGS. 1 and 2, the communication device 104 further comprises a training controller 160 that is configured to control the communication device 104 to transmit the first training signals 208 during the first portion 204 of the training procedure 200. In some embodiments, the training controller 160 is also configured to control the communication device 104 to transmit the second training signals 260 during the second portion 256 of the training procedure 200.

Additionally, the training controller 160 is configured to generate first training information 240 using first signal processing parameters developed by the signal processing components 120-1 during the first portion 204 of the training procedure 200. Also, the training controller 160 is configured to transmit the first training information 240 to the communication device 108 via the full-duplex communication link 112. In some embodiments, the first signal processing parameters developed by the signal processing components 120-1 during the first portion 204 include one or both of: i) echo cancelation parameters and ii) NEXT cancellation parameters. In other embodiments, the first signal processing parameters developed by the signal processing components 120-1 during the first portion 204 additionally or alternatively include other suitable signal processing parameters developed by other suitable signal processing components.

Further, the training controller 160 is configured to receive the second training information 244 from the communication device 108 via the full-duplex communication link 112, and to provide the second training information 244 to the signal processing components 120-1 for use by the signal processing components 120-1. In some embodiments, the second training information 244 corresponds to initial values of equalizer parameters and/or FEXT cancellation parameters. In other embodiments, second training information 244 additionally or alternatively correspond to other suitable signal processing parameters developed by other suitable signal processing components.

The communication device 108 further comprises a training controller 164 that is configured to control the communication device 108 to transmit the third training signals 264 during the second portion 256 of the training procedure 200.

Additionally, the training controller 164 is configured to generate the second training information 244 using second signal processing parameters developed by the signal processing components 120-2 during the first portion 204 of the training procedure 200. Also, the training controller 164 is configured to transmit the second training information 244 to the communication device 104 via the full-duplex communication link 112. In some embodiments, the second signal processing parameters developed by the signal processing components 120-2 during the first portion 204 include one or both of: i) equalizer parameters and ii) FEXT cancellation parameters. In other embodiments, the second signal processing parameters developed by the signal processing components 120-2 during the first portion 204 additionally or alternatively include other suitable signal processing parameters developed by other suitable signal processing components.

Further, the training controller 164 is configured to receive the first training information 240 from the communication device 104 via the full-duplex communication link 112, and to provide the first training information 240 to the signal processing components 120-2 for use by the signal processing components 120-2. In some embodiments, the first training information 240 corresponds to initial values of echo cancellation parameters and/or NEXT cancellation parameters. In other embodiments, first training information 240 additionally or alternatively correspond to other suitable signal processing parameters developed by other suitable signal processing components.

In various embodiments, one or more of the signal processing components 120-1 are implemented using one or more signal processors. For instance, a signal processor comprises hardware logic circuitry configured to implement signal processing functions of the signal processing components 120-1, according to an embodiment.

In other embodiments, a signal processor comprises a digital signal processor (DSP) configured to execute machine readable instructions stored in a memory; the machine-readable instructions, when executed by the DSP, cause the DSP to implement signal processing functions of the signal processing components 120-1.

In various embodiments, one or more of the adaptive equalizer 124-1, the echo canceller 128-1, the NEXT canceller 132-1, and the FEXT canceller 136-1 are implemented using one or more signal processors. In some embodiments, one or more the adaptive equalizer 124-1, the echo canceller 128-1, the NEXT canceller 132-1, and the FEXT canceller 136-1 comprises hardware logic circuitry configured to implement one or more of adaptive equalization, echo cancellation, NEXT cancellation, and FEXT cancellation. In some embodiments, the signal processor implementing one or more the adaptive equalizer 124-1, the echo canceller 128-1, the NEXT canceller 132-1, and the FEXT canceller 136-1 comprises a DSP configured to execute machine readable instructions stored in a memory; the machine readable instructions, when executed by the DSP, cause the DSP to implement one or more of adaptive equalization, echo cancellation, NEXT cancellation, and FEXT cancellation.

In various embodiments, the signal processing components 120-2 of the communication device 108 are structured similarly to the signal processing components 120-1 of the communication device 104.

In an embodiment, the training controller 160 comprises hardware circuitry (e.g., comprising a hardware state machine) configured to perform at least some of the acts of the training controller 160 described above. In another embodiment, the training controller 160 comprises a processor configured to execute machine readable instructions stored in a memory; the machine-readable instructions, when executed by the processor, cause the processor to perform at least some of the acts of the training controller 160 described above.

In various embodiments, the training controller 164 of the communication device 108 is structured similarly to the training controller 160 of the communication device 104.

The communication device 104 further comprises a transceiver 180 configured to transmit and receive signals via the full-duplex communication link 112, such as training signals described above and signals carrying user information. Similarly, the communication device 108 further comprises a transceiver 184 configured to transmit and receive signals via the full-duplex communication link 112, such as training signals described above and signals carrying user information.

In some embodiments, after the first portion 204 of the training procedure 200, the adaptive equalizer 124-2 of the follower has converged and thus the follower is capable of detecting and decoding information transmitted by the leader. Thus, the first training information 240 can be transmitted from the leader to the follower in a straightforward manner.

On the other hand, after the first portion 204 of the training procedure 200, the adaptive equalizer 124-1 is not yet trained and thus the leader may not be capable of detecting and decoding information transmitted by the follower using standard transmission techniques typically utilized on trained communication links, according to some embodiments. Thus, in some embodiments, the follower uses a robust modulation transmission technique to transmit the second training information 244 to the leader so that the leader can detect and decode the training information 244 even though the adaptive equalizer 124-1 of the leader is not yet trained.

Various versions of IEEE 802.3 Standard define an alert signal that is designed so that a communication device with an untrained equalizer can detect the alert signal. In some embodiments, the follower is configured to transmit the second training information 244 by modulating the second training information 244 on a plurality of alert signals. For example, different bit values in the second training information 244 are represented by alert signals transmitted with different polarities, according to an embodiment. For example, a bit value of zero is represented by an alert signal having a positive polarity, whereas a bit value of one is represented by an alert signal having a negative polarity, or vice versa, in an illustrative embodiment. In other embodiments, information in the second training information 244 is modulated on alert signals in another suitable manner.

Figure 3:
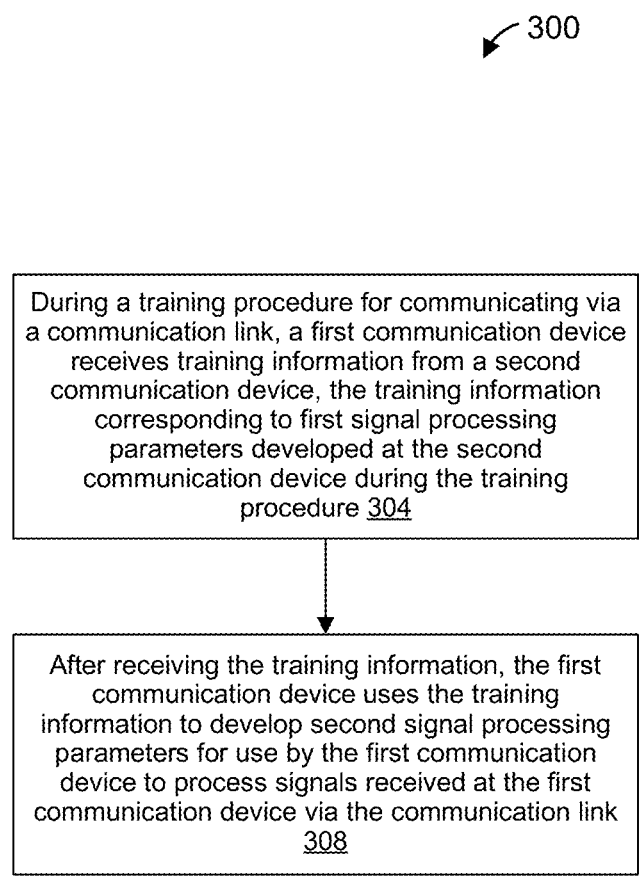
FIG. 3 is a flow diagram of an example method for training a communication device to communicate via a full-duplex communication link using training information received from a link partner, according to an embodiment.

FIG. 3 is a flow diagram of an example method 300 for training a communication device to communicate via a full-duplex communication link using training information received from a link partner, according to an embodiment. In an embodiment, the method 300 is implemented by the communication device 104 of FIG. 1 (e.g., a leader). In another embodiment, the method 300 is implemented by the communication device 108 of FIG. 1 (e.g., a follower). In various embodiments, the method 300 is implemented in conjunction with various aspects of the training procedure 200 of FIG. 2. Accordingly, FIG. 3 is described with reference to FIGS. 1 and 2 merely for explanatory purposes. In other embodiments, the method 300 is implemented by a suitable communication device different than the communication device 104 and the communication device 108 of FIG. 1, and/or in conjunction with other suitable training procedures different than the training procedure 200 of FIG. 2.

At block 304, during a training procedure (e.g., the training procedure 200 or another suitable training procedure) for training a first communication to communicate via a full-duplex communication link, the first communication device receives training information from a second communication device. The training information received at block 304 corresponds to first signal processing parameters developed at the second communication device during the training procedure. The first signal processing parameters developed at the second communication device during the training procedure are for use by the second communication device to process signals received by the second communication device via the full-duplex communication link, according to an embodiment. In some embodiments, the second communication device develops the first signal processing parameters based on first training signals transmitted by the second communication device to the first communication device. In other embodiments, the second communication device develops the first signal processing parameters based on first training signals transmitted by the first communication device to the second communication device.

In some embodiments, the first communication device 104 receives training information 244 that corresponds to one or both of i) equalizer parameters and ii) FEXT cancellation parameters. In some embodiments, the first communication device 104 receives training information 244 that corresponds to one or both of i) echo cancellation parameters and ii) NEXT cancellation parameters.

At block 308, after receiving the training information at block 304, the first communication device develops, using the training information, second signal processing parameters for use by the first communication device to process signals received at the first communication device via the full-duplex communication link. In some embodiments, developing the second signal processing parameters at block 308 comprises: using the training information received at block 304 to determine initial values of the second signal processing parameters, and then adapting the second signal processing parameters from the initial values based on second training signals transmitted by or received by the first communication device.

In some embodiments in which the first communication device 104 receives, at block 304, training information that corresponds to one or both of i) equalizer parameters and ii) FEXT cancellation parameters, developing the second signal processing parameters at block 308 comprises: using the training information received at block 304 to determine initial values of one or both of i) equalizer parameters and ii) FEXT cancellation parameters, and then adapting the one or both of i) equalizer parameters and ii) FEXT cancellation parameters from the initial values, based on second training signals received by the first communication device.

In some embodiments, in which the first communication device 104 receives, at block 304, training information that corresponds to one or both of i) echo cancellation parameters and ii) NEXT cancellation parameters, developing the second signal processing parameters at block 308 comprises: using the training information received at block 304 to determine initial values of one or both of i) echo cancellation parameters and ii) NEXT cancellation parameters, and then adapting the one or both of i) echo cancellation parameters and ii) NEXT cancellation parameters from the initial values, based on second training signals transmitted by the first communication device.

Figure 4:
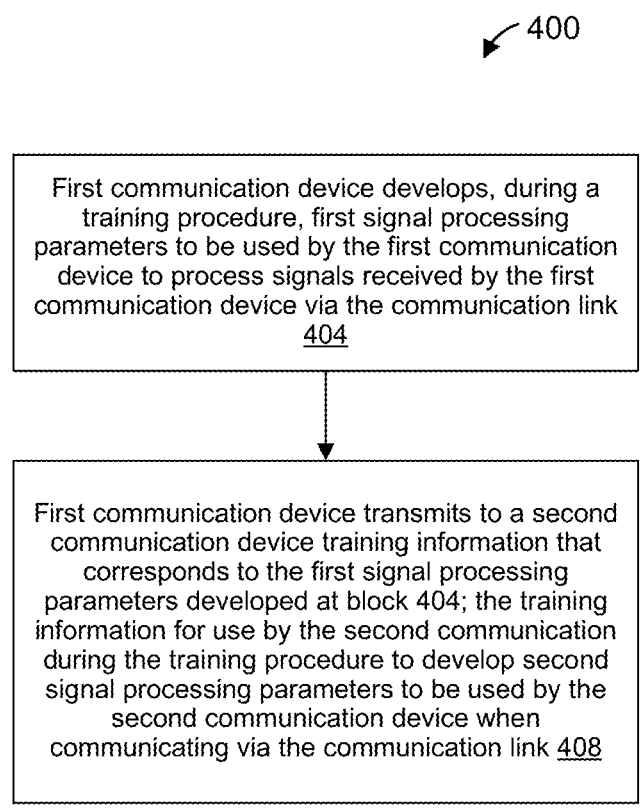
FIG. 4 is a flow diagram of an example method for developing, at a communication device, training information for communicating via a full-duplex communication link, and transmitting the training information to a link partner to assist the link partner in developing signal processing parameters that will be used by the link partner for communicating via the full-duplex communication link, according to an embodiment.

FIG. 4 is a flow diagram of an example method 400 for developing, at a communication device, training information for communicating via a full-duplex communication link, and transmitting the training information to a link partner to assist the link partner in developing signal processing parameters that will be used by the link partner for communicating via the full-duplex communication link, according to an embodiment. In an embodiment, the method 400 is implemented by the communication device 104 of FIG. 1 (e.g., a leader). In another embodiment, the method 400 is implemented by the communication device 108 of FIG. 1 (e.g., a follower). In various embodiments, the method 400 is implemented in conjunction with various aspects of the training procedure 200 of FIG. 2. Accordingly, FIG. 4 is described with reference to FIGS. 1 and 2 merely for explanatory purposes. In other embodiments, the method 400 is implemented by a suitable communication device different than the communication device 104 and the communication device 108 of FIG. 1, and/or in conjunction with other suitable training procedures different than the training procedure 200 of FIG. 2.

At block 404, during a first portion of a training procedure (e.g., the training procedure 200 or another suitable training procedure) for training a first communication device to communicate via a full-duplex communication link, the first communication device develops first signal processing parameters to be used by the first communication device to process signals received by the first communication device via the full-duplex communication link.

In some embodiments, the method 400 further comprises transmitting, by the first communication device, first training signals during the training procedure, and developing the first signal processing parameters at block 404 comprises developing the first signal processing parameters based on the transmission of the first training signals. In some embodiments in which the method 400 comprises transmitting, by the first communication device, first training signals during the training procedure, developing the first signal processing parameters at block 404 comprises developing one or both of i) echo cancellation parameters and ii) NEXT cancellation parameters based on the transmission of the first training signals.

In some embodiments, the method 400 further comprises receiving, by the first communication device, first training signals during the training procedure, and developing the first signal processing parameters at block 404 comprises developing the first signal processing parameters based on the reception of the first training signals. In some embodiments in which the method 400 comprises receiving, by the first communication device, first training signals during the training procedure, developing the first signal processing parameters at block 404 comprises developing one or both of i) equalizer parameters and ii) FEXT cancellation parameters, based on the reception of the first training signals.

At block 408, the first communication device transmits to a second communication device training information that corresponds to the first signal processing parameters developed at block 404. The training information is for use by the second communication device during the training procedure to develop second signal processing parameters to be used by the second communication device when communicating via the full-duplex communication link.

In some embodiments, the training information transmitted at block 408 corresponds to initial values of the second signal processing parameters. In such embodiments, the second communication device sets the second signal processing parameters to the initial values indicated by the training information, and then adapts the second signal processing parameters from the initial values based on second training signals transmitted by the first communication device or by the second communication device.

In some embodiments in which the first communication device 104 develops, at block 404, first signal processing parameters that corresponds to one or both of i) equalizer parameters and ii) FEXT cancellation parameters, the training information transmitted by the first communication device at block 408 corresponds to initial values of one or both of i) equalizer parameters and ii) FEXT cancellation parameters. In such embodiments, the second communication device sets the one or both of i) equalizer parameters and ii) FEXT cancellation parameters to the initial values, and then adapts the one or both of i) equalizer parameters and ii) FEXT cancellation parameters, from the initial values based on second training signals transmitted by the first communication device.

In some embodiments, in which the first communication device 104 develops, at block 404, first signal processing parameters that corresponds to one or both of i) echo cancellation parameters and ii) NEXT cancellation parameters, the training information transmitted by the first communication device at block 408 corresponds to initial values of one or both of i) echo cancellation parameters and ii) NEXT cancellation parameters. In such embodiments, the second communication device sets the one or both of i) echo cancellation parameters and ii) NEXT cancellation parameters to the initial values, and then adapts the one or both of i) echo cancellation parameters and ii) NEXT cancellation parameters, from the initial values based on second training signals transmitted by the second communication device.

In some embodiments, the method 400 is implemented in conjunction with the method 300 of FIG. 3. For example, a single communication device performs both the method 300 and the method 400, according to an embodiment.

Embodiment 1: A method for training communication devices for communicating via a full-duplex communication link, the method comprising: during a training procedure for communicating via the full-duplex communication link, receiving, at a first communication device, training information from a second communication device, the training information corresponding to first signal processing parameters developed at the second communication device for use by the second communication device to process signals received by the second communication device via the full-duplex communication link; and after receiving the training information, developing, at the first communication device, second signal processing parameters to be used by the first communication device to process signals received by the first communication device via the full-duplex communication link, the second signal processing parameters being developed using the training information, received from the second communication device, that corresponds to the first signal processing parameters developed by the second communication device for use by the second communication device when the second communication device processes signals received by the second communication device.

Embodiment 2: The method for training communication devices of embodiment 1, wherein developing the second signal processing parameters comprises: determining, at the first communication device, initial values of at least some of the second signal processing parameters using the received training information; and adapting, at the first communication device, the at least some second signal processing parameters from the initial values based on further training signals transmitted by the first communication device or received by the first communication device.

Embodiment 3: The method for training communication devices of either of embodiments 1 or 2, further comprising: transmitting, by the first communication device, first training signals to the second communication device during a first portion of the training procedure; and receiving, by the first communication device, second training signals from the second communication device after receiving the training information and during a second portion of the training procedure; wherein developing the second signal processing parameters further comprises using reception of the second training signals to adapt the second signal processing parameters.

Embodiment 4: The method for training communication devices of embodiment 3, wherein: receiving the training information from the second communication device comprises receiving equalizer parameter information corresponding to first equalizer coefficients developed by the second communication device to process signals received by the second communication device via the full-duplex communication link; and developing the second signal processing parameters comprises developing second equalizer coefficients using the received equalizer information, the second equalizer coefficients to be used by the first communication device to process signals received by the first communication device via the full-duplex communication link.

Embodiment 5: The method for training communication devices of embodiment 3, wherein: receiving the training information from the second communication device comprises receiving far-end crosstalk cancellation information corresponding to first far-end crosstalk cancellation parameters developed by the second communication device to process signals received by the second communication device via the full-duplex communication link; and developing the second signal processing parameters comprises developing second far-end crosstalk cancellation parameters using the far-end crosstalk cancellation information, the second far-end crosstalk cancellation parameters to be used by the first communication device to process signals received by the first communication device via the full-duplex communication link.

Embodiment 6: The method for training communication devices of either of embodiments 1 or 2, further comprising: transmitting, by the first communication device, training signals after receiving the training information; wherein developing the second signal processing parameters further comprises adapting the second signal processing parameters based on the transmission of the second training signals.

Embodiment 7: The method for training communication devices of embodiment 6, wherein at least one of i and ii: i) receiving the training information from the second communication device comprises receiving echo cancellation information corresponding to first echo cancellation parameters developed by the second communication device to be used by the second communication device to process signals received by the second communication device; and developing the second signal processing parameters comprises developing second echo cancellation parameters using the echo cancellation information received from the second communication device, the second echo cancellation parameters to be used by the first communication device to process signals received by the first communication device; and ii) receiving the training information from the second communication device comprises receiving near-end crosstalk cancellation information corresponding to first near-end crosstalk cancellation parameters developed by the second communication device to be used by the second communication device to process signals received by the second communication device; and developing the second signal processing parameters comprises developing second near-end crosstalk cancellation parameters using the near-end crosstalk cancellation information received from the second communication device, the second near-end crosstalk cancellation parameters to be used by the first communication device to process signals received by the first communication device.

Embodiment 8: A first communication device, comprising: a transceiver configured to communicate via a full-duplex communication link; a controller configured to: receive, during a training procedure for communicating via the full-duplex communication link, training information from a second communication device, the training information corresponding to first signal processing parameters developed at the second communication device for use by the second communication device to process signals received by the second communication device via the full-duplex communication link, and use the training information to determine initial values of at least some second signal processing parameters for use by one or more signal processors of the first communication device; and the one or more signal processors of the first communication device being configured to: adapt the at least some second signal processing parameters from the initial values, the initial values having been determined using the training information received from the second communication device, and process signals received via the full-duplex communication link based on adapted second signal processing parameters.

Embodiment 9: The first communication device of embodiment 8, wherein: the controller is configured to control the transceiver to transmit first training signals to the second communication device during a first portion of the training procedure; and the one or more signal processors are configured to adapt, during a second portion of the training procedure, the second signal processing parameters using second training signals received from the second communication device.

Embodiment 10: The first communication device of embodiment 9, wherein: the controller is configured to: receive equalizer parameter information corresponding to first equalizer coefficients developed by the second communication device to process signals received by the second communication device via the full-duplex communication link, and determine initial values for at least some second equalizer coefficients using the equalizer parameter information; and the one or more signal processors comprises an adaptive equalizer configured to process signals received by the transceiver, and to adapt, during the second portion of the training procedure, the at least some second equalizer coefficients from the initial values.

Embodiment 11: The first communication device of embodiment 9, wherein: the controller is configured to: receive far-end crosstalk cancellation information corresponding to first far-end crosstalk cancellation parameters developed by the second communication device to process signals received by the second communication device via the full-duplex communication link, and determine initial values for at least some second far-end crosstalk cancellation parameters using the far-end crosstalk cancellation information; and the one or more signal processors comprises a far-end crosstalk canceller configured to process signals received by the transceiver, and to adapt, during the second portion of the training procedure, the at least some second far-end crosstalk cancellation parameters from the initial values.

Embodiment 12: The first communication device of embodiment 8, further comprising: the controller is configured to control the transceiver to transmit training signals to the second communication device after receiving the training information from the second communication device; and the one or more signal processors are configured to adapt the second signal processing parameters based on at least one of i) echo signals and ii) crosstalk signals received by the first communication device in connection with the transmission of the training signals by the first communication device.

Embodiment 13: The first communication device of embodiment 12, wherein at least one of i and ii: i) the controller is configured to: receive echo cancellation information corresponding to first echo cancellation parameters developed by the second communication device to process signals received by the second communication device via the full-duplex communication link, and determine initial values for at least some second echo cancellation parameters using the echo cancellation information; and the one or more signal processors comprises an echo canceller configured to process signals received by the transceiver, and to adapt the at least some second echo cancellation parameters from the initial values during the training procedure; and ii) the controller is configured to: receive near-end crosstalk cancellation information corresponding to first near-end crosstalk cancellation parameters developed by the second communication device to process signals received by the second communication device via the full-duplex communication link, and determine initial values for at least some second near-end crosstalk cancellation parameters using the near-end crosstalk cancellation information; and the one or more signal processors comprises a near-end crosstalk canceller configured to process signals received by the transceiver, and to adapt the at least some second near-end crosstalk cancellation parameters from the initial values during the training procedure.

Embodiment 14: A method for training communication devices for communicating via a full-duplex communication link, the method comprising: during a first portion of a training procedure for communicating via the full-duplex communication link, developing, at a first communication device, first signal processing parameters to be used by the first communication device to process signals received by the first communication device via the full-duplex communication link; and transmitting, by the first communication device to a second communication device, training information corresponding to the first signal processing parameters, the training information transmitted by the first communication device to be used by the second communication device in a second portion of the training procedure to develop second signal processing parameters to be used by the second communication device when communicating with the first communication device via the full-duplex communication link.

Embodiment 15: The method for training communication devices of embodiment 14, wherein transmitting the training information comprises: transmitting training information that corresponds to the first signal processing parameters and that is configured to be used by the second communication device to determine initial values of at least some of the second signal processing parameters when adapting the second signal processing parameters during the second portion of the training procedure.

Embodiment 16: The method for training communication devices of either of embodiments 14 or 15, further comprising: receiving, at the first communication device, first training signals from the second communication device during the first portion of the training procedure; and after transmitting the training information and during the second portion of the training procedure, transmitting, by the first communication device, second training signals to the second communication device; wherein developing the first signal processing parameters during the first portion of the training procedure comprises developing the first signal processing parameters based on reception of the first training signals.

Embodiment 17: The method for training communication devices of embodiment 16, wherein: developing the first signal processing parameters during the first portion of the training procedure comprises developing first equalizer coefficients to be used by the first communication device to process signals received by the first communication device via the full-duplex communication link; and transmitting the training information to the second communication device comprises transmitting equalizer coefficient information corresponding to the first equalizer coefficients developed by the first communication device, the equalizer coefficient information to be used by the second communication device in the second portion of the training procedure to develop second equalizer coefficients to be used by the second communication device to process signals received by the second communication device via the full-duplex communication link.

Embodiment 18: The method for training communication devices of embodiment 16, wherein: developing the first signal processing parameters during the first portion of the training procedure comprises developing first far-end crosstalk cancellation parameters to be used by the first communication device to process signals received by the first communication device via the full-duplex communication link; and transmitting the training information to the second communication device comprises transmitting far-end crosstalk cancellation information corresponding to the first far-end crosstalk cancellation parameters developed by the first communication device, the far-end crosstalk cancellation information to be used by the second communication device in the second portion of the training procedure to develop second far-end crosstalk cancellation parameters to be used by the second communication device to process signals received by the second communication device via the full-duplex communication link.

Embodiment 19: The method for training communication devices of either of embodiments 14 or 15, further comprising: transmitting, by the first communication device, first training signals to the second communication device during the first portion of the training procedure; and receiving, at the first communication device, second training signals from the second communication device after transmitting the training information and during the second portion of the training procedure; wherein developing the first signal processing parameters during the first portion of the training procedure comprises developing the first signal processing parameters based on the transmission of the first training signals.

Embodiment 20: The method for training communication devices of embodiment 19, wherein: developing the first signal processing parameters during the first portion of the training procedure comprises developing at least one of i) first echo cancellation parameters and ii) first near-end crosstalk cancellation parameters to be used by the first communication device to process signals received by the first communication device via the full-duplex communication link; and transmitting the training information to the second communication device comprises at least one of: i) transmitting echo cancellation information corresponding to the first echo cancellation parameters developed by the first communication device, the echo cancellation information to be used by the second communication in the second portion of the training procedure to develop second echo cancellation parameters to be used by the second communication device to process signals received by the second communication device via the full-duplex communication link, and ii) transmitting near-end crosstalk cancellation information corresponding to the first near-end crosstalk cancellation parameters developed by the first communication device, the near-end crosstalk cancellation information to be used by the second communication in the second portion of the training procedure to develop second near-end crosstalk cancellation parameters to be used by the second communication device to process signals received by the second communication device via the full-duplex communication link.

Embodiment 21: A first communication device, comprising: a transceiver configured to communicate via a full-duplex communication link; one or more signal processors configured to: develop, during a first portion of a training procedure for communicating via the full-duplex communication link, first signal processing parameters to be used by the one or more signal processors to process signals received by the first communication device via the full-duplex communication link; and a controller configured to: determine training information corresponding to the first signal processing parameters, and control the transceiver to transmit the training information to the second communication device, the training information transmitted by the first communication device to be used by the second communication device in a second portion of the training procedure to develop second signal processing parameters to be used by the second communication device when communicating with the first communication device via the full-duplex communication link.

Embodiment 22: The first communication device of embodiment 21, wherein the controller is configured to: determine training information that corresponds to the first signal processing parameters and that is configured to be used by the second communication device to determine initial values of at least some of the second signal processing parameters when adapting the second signal processing parameters during the second portion of the training procedure.

Embodiment 23: The first communication device of either of embodiments 21 or 22, wherein: the one or more signal processors are configured to develop the first signal processing parameters based on reception of first training signals during the first portion of the training procedure; and the controller is configured to control the transceiver to transmit, during the second portion of the training procedure, second training signals to the second communication device after transmitting the training information.

Embodiment 24: The first communication device of embodiment 23, wherein: the one or more signal processors comprises a first adaptive equalizer configured to develop, during the first portion of the training procedure, first equalizer coefficients to be used by the first communication device to process signals received by the first communication device via the full-duplex communication link; and the controller is configured to: determine equalizer coefficient information that corresponds to the first equalizer coefficients and that is configured to be used by the second communication device to determine initial values of at least some of second equalizer coefficients to be used when adapting a second adaptive equalizer during the second portion of the training procedure, and control the transceiver to transmit the equalizer coefficient information to the second communication device.

Embodiment 25: The first communication device of embodiment 23, wherein: the one or more signal processors comprises a first far-end crosstalk canceller configured to develop, during the first portion of the training procedure, first far-end crosstalk cancellation parameters to be used by the first communication device to process signals received by the first communication device via the full-duplex communication link; and the controller is configured to: determine far-end crosstalk cancellation information that corresponds to the first far-end crosstalk cancellation parameters and that is configured to be used by the second communication device to determine initial values of at least some of second far-end crosstalk cancellation parameters to be used when adapting a second far-end crosstalk canceller during the second portion of the training procedure, and control the transceiver to transmit the far-end crosstalk cancellation information to the second communication device.

Embodiment 26: The first communication device of either of embodiments 21 or 22, further comprising: the controller is configured to control the transceiver to transmit first training signals to the second communication device during the first portion of the training procedure; the one or more signal processors are configured to develop the first signal processing parameters based on the transmission of the first training signals.

Embodiment 27: The first communication device of embodiment 26, wherein at least one of i and ii: i) the one or more signal processors comprises an echo canceller; and the controller is configured to: determine echo cancellation information corresponding to first echo cancellation parameters developed by the first echo canceller, and control the transceiver to transmit the echo cancellation information to the second communication device; and ii) the one or more signal processors comprises a first near-end crosstalk canceller; and the controller is configured to: determine near-end crosstalk cancellation information corresponding to first near-end crosstalk cancellation parameters developed by the first near-end crosstalk canceller, and control the transceiver to transmit the near-end crosstalk cancellation information to the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for training communication devices for communicating via a full-duplex communication link, the method comprising:
    during a training procedure for communicating via the full-duplex communication link, receiving, at a first communication device, training information from a second communication device, the training information corresponding to first signal processing parameters developed at the second communication device for use by the second communication device to process signals received by the second communication device via the full-duplex communication link; and
    after receiving the training information, developing, at the first communication device, second signal processing parameters to be used by the first communication device to process signals received by the first communication device via the full-duplex communication link, the second signal processing parameters being developed using the training information that was received from the second communication device and that corresponds to the first signal processing parameters developed by the second communication device for use by the second communication device when the second communication device processes the signals received by the second communication device.

2. The method for training the communication devices of claim 1, wherein developing the second signal processing parameters comprises:
    determining, at the first communication device, initial values of at least some of the second signal processing parameters using the received training information; and
    adapting, at the first communication device, the at least some second signal processing parameters from the initial values based on further training signals transmitted by the first communication device or received by the first communication device.

3. The method for training the communication devices of claim 1, further comprising:
    transmitting, by the first communication device, first training signals to the second communication device during a first portion of the training procedure; and
    receiving, by the first communication device, second training signals from the second communication device after receiving the training information and during a second portion of the training procedure;
    wherein developing the second signal processing parameters further comprises using reception of the second training signals to adapt the second signal processing parameters.

4. The method for training the communication devices of claim 3, wherein:
    receiving the training information from the second communication device comprises receiving equalizer parameter information corresponding to first equalizer coefficients developed by the second communication device to process the signals received by the second communication device via the full-duplex communication link; and
    developing the second signal processing parameters comprises developing second equalizer coefficients using the received equalizer parameter information, the second equalizer coefficients to be used by the first communication device to process the signals received by the first communication device via the full-duplex communication link.

5. The method for training the communication devices of claim 3, wherein:
    receiving the training information from the second communication device comprises receiving far-end crosstalk cancellation information corresponding to first far-end crosstalk cancellation parameters developed by the second communication device to process the signals received by the second communication device via the full-duplex communication link; and
    developing the second signal processing parameters comprises developing second far-end crosstalk cancellation parameters using the far-end crosstalk cancellation information, the second far-end crosstalk cancellation parameters to be used by the first communication device to process the signals received by the first communication device via the full-duplex communication link.

6. The method for training the communication devices of claim 1, further comprising:
    transmitting, by the first communication device, training signals after receiving the training information;
    wherein developing the second signal processing parameters further comprises adapting the second signal processing parameters based on the transmission of the training signals.

7. The method for training the communication devices of claim 6, wherein at least one of i) and ii):
    i) receiving the training information from the second communication device comprises receiving echo cancellation information corresponding to first echo cancellation parameters developed by the second communication device to be used by the second communication device to process the signals received by the second communication device; and developing the second signal processing parameters comprises developing second echo cancellation parameters using the echo cancellation information received from the second communication device, the second echo cancellation parameters to be used by the first communication device to process the signals received by the first communication device; and
    ii) receiving the training information from the second communication device comprises receiving near-end crosstalk cancellation information corresponding to first near-end crosstalk cancellation parameters developed by the second communication device to be used by the second communication device to process the signals received by the second communication device; and developing the second signal processing parameters comprises developing second near-end crosstalk cancellation parameters using the near-end crosstalk cancellation information received from the second communication device, the second near-end crosstalk cancellation parameters to be used by the first communication device to process the signals received by the first communication device.

8. A first communication device, comprising:
a transceiver configured to communicate via a full-duplex communication link;
a controller configured to:
receive, during a training procedure for communicating via the full-duplex communication link, training information from a second communication device, the training information corresponding to first signal processing parameters developed at the second communication device for use by the second communication device to process signals received by the second communication device via the full-duplex communication link, and
use the training information to determine initial values of at least some second signal processing parameters for use by one or more signal processors of the first communication device; and
the one or more signal processors of the first communication device being configured to:
adapt the at least some second signal processing parameters from the initial values during the training procedure, the initial values having been determined using the training information received from the second communication device, and
process signals received via the full-duplex communication link based on the adapted at least some second signal processing parameters.

9. The first communication device of claim 8, wherein:
the controller is configured to control the transceiver to transmit first training signals to the second communication device during a first portion of the training procedure; and
the one or more signal processors are configured to adapt, during a second portion of the training procedure, the at least some second signal processing parameters using second training signals received from the second communication device.

10. The first communication device of claim 9, wherein:
the controller is further configured to:
receive equalizer parameter information corresponding to first equalizer coefficients developed by the second communication device to process the signals received by the second communication device via the full-duplex communication link, and
determine initial values for at least some second equalizer coefficients using the equalizer parameter information; and
the one or more signal processors comprise an adaptive equalizer configured to process signals received by the transceiver, and to adapt, during the second portion of the training procedure, the at least some second equalizer coefficients from the initial values.

11. The first communication device of claim 9, wherein:
the controller is further configured to:
receive far-end crosstalk cancellation information corresponding to first far-end crosstalk cancellation parameters developed by the second communication device to process the signals received by the second communication device via the full-duplex communication link, and
determine initial values for at least some second far-end crosstalk cancellation parameters using the far-end crosstalk cancellation information; and the one or more signal processors comprises a far-end crosstalk canceller configured to process signals received by the transceiver, and to adapt, during the second portion of the training procedure, the at least some second far-end crosstalk cancellation parameters from the initial values.

12. The first communication device of claim 8, wherein:
the controller is configured to control the transceiver to transmit training signals to the second communication device after receiving the training information from the second communication device; and
the one or more signal processors are configured to adapt the second signal processing parameters based on at least one of i) echo signals and ii) crosstalk signals received by the first communication device in connection with the transmission of the training signals by the first communication device.

13. The first communication device of claim 12, wherein at least one of i) and ii):
i) the controller is further configured to:
receive echo cancellation information corresponding to first echo cancellation parameters developed by the second communication device to process the signals received by the second communication device via the full-duplex communication link, and
determine initial values for at least some second echo cancellation parameters using the echo cancellation information; and
the one or more signal processors comprise an echo canceller configured to process signals received by the transceiver, and to adapt the at least some second echo cancellation parameters from the initial values during the training procedure; and
ii) the controller is further configured to:
receive near-end crosstalk cancellation information corresponding to first near-end crosstalk cancellation parameters developed by the second communication device to process the signals received by the second communication device via the full-duplex communication link, and
determine initial values for at least some second near-end crosstalk cancellation parameters using the near-end crosstalk cancellation information; and
the one or more signal processors comprise a near-end crosstalk canceller configured to process signals received by the transceiver, and to adapt the at least some second near-end crosstalk cancellation parameters from the initial values during the training procedure.

14. A method for training communication devices for communicating via a full-duplex communication link, the method comprising:
during a first portion of a training procedure for communicating via the full-duplex communication link, developing, at a first communication device, first signal processing parameters to be used by the first communication device to process signals received by the first communication device via the full-duplex communication link; and
transmitting, by the first communication device to a second communication device, training information corresponding to the first signal processing parameters, the training information transmitted by the first communication device to be used by the second communication device in a second portion of the training procedure to develop second signal processing parameters to be used by the second communication device when communicating with the first communication device via the full-duplex communication link.

15. The method for training the communication devices of claim 14, wherein transmitting the training information comprises:
    transmitting the training information that corresponds to the first signal processing parameters and that is configured to be used by the second communication device to determine initial values of at least some of the second signal processing parameters when adapting the second signal processing parameters during the second portion of the training procedure.

16. The method for training the communication devices of claim 14, further comprising:
    receiving, at the first communication device, first training signals from the second communication device during the first portion of the training procedure; and
    after transmitting the training information and during the second portion of the training procedure, transmitting, by the first communication device, second training signals to the second communication device;
    wherein developing the first signal processing parameters during the first portion of the training procedure comprises developing the first signal processing parameters based on the reception of the first training signals.

17. The method for training the communication devices of claim 16, wherein:
    developing the first signal processing parameters during the first portion of the training procedure comprises developing first equalizer coefficients to be used by the first communication device to process the signals received by the first communication device via the full-duplex communication link; and
    transmitting the training information to the second communication device comprises transmitting equalizer coefficient information corresponding to the first equalizer coefficients developed by the first communication device, the equalizer coefficient information to be used by the second communication device in the second portion of the training procedure to develop second equalizer coefficients to be used by the second communication device to process the signals received by the second communication device via the full-duplex communication link.

18. The method for training the communication devices of claim 16, wherein:
    developing the first signal processing parameters during the first portion of the training procedure comprises developing first far-end crosstalk cancellation parameters to be used by the first communication device to process the signals received by the first communication device via the full-duplex communication link; and
    transmitting the training information to the second communication device comprises transmitting far-end crosstalk cancellation information corresponding to the first far-end crosstalk cancellation parameters developed by the first communication device, the far-end crosstalk cancellation information to be used by the second communication device in the second portion of the training procedure to develop second far-end crosstalk cancellation parameters to be used by the second communication device to process the signals received by the second communication device via the full-duplex communication link.

19. The method for training the communication devices of claim 14, further comprising:
    transmitting, by the first communication device, first training signals to the second communication device during the first portion of the training procedure; and
    receiving, at the first communication device, second training signals from the second communication device after transmitting the training information and during the second portion of the training procedure;
    wherein developing the first signal processing parameters during the first portion of the training procedure comprises developing the first signal processing parameters based on the transmission of the first training signals.

20. The method for training the communication devices of claim 19, wherein:
    developing the first signal processing parameters during the first portion of the training procedure comprises developing at least one of i) first echo cancellation parameters and ii) first near-end crosstalk cancellation parameters to be used by the first communication device to process the signals received by the first communication device via the full-duplex communication link; and
    transmitting the training information to the second communication device comprises at least one of i) and ii):
        i) transmitting echo cancellation information corresponding to the first echo cancellation parameters developed by the first communication device, the echo cancellation information to be used by the second communication device in the second portion of the training procedure to develop second echo cancellation parameters to be used by the second communication device to process the signals received by the second communication device via the full-duplex communication link, and
        ii) transmitting near-end crosstalk cancellation information corresponding to the first near-end crosstalk cancellation parameters developed by the first communication device, the near-end crosstalk cancellation information to be used by the second communication device in the second portion of the training procedure to develop second near-end crosstalk cancellation parameters to be used by the second communication device to process the signals received by the second communication device via the full-duplex communication link.

21. A first communication device, comprising:
    a transceiver configured to communicate via a full-duplex communication link;
    one or more signal processors configured to:
        develop, during a first portion of a training procedure for communicating via the full-duplex communication link, first signal processing parameters to be used by the one or more signal processors to process signals received by the first communication device via the full-duplex communication link; and
    a controller configured to:
        determine training information corresponding to the first signal processing parameters, and
        control the transceiver to transmit the training information to a second communication device, the training information transmitted by the first communication device to be used by the second communication device in a second portion of the training procedure to develop second signal processing parameters to be used by the second communication device when communicating with the first communication device via the full-duplex communication link.

22. The first communication device of claim 21, wherein the controller is configured to:
- determine the training information that corresponds to the first signal processing parameters and that is configured to be used by the second communication device to determine initial values of at least some of the second signal processing parameters when adapting the second signal processing parameters during the second portion of the training procedure.

23. The first communication device of claim 21, wherein:
- the one or more signal processors are configured to develop the first signal processing parameters based on reception of first training signals during the first portion of the training procedure; and
- the controller is configured to control the transceiver to transmit, during the second portion of the training procedure, second training signals to the second communication device after transmitting the training information.

24. The first communication device of claim 23, wherein:
- the one or more signal processors comprise a first adaptive equalizer configured to develop, during the first portion of the training procedure, first equalizer coefficients to be used by the first communication device to process the signals received by the first communication device via the full-duplex communication link; and
- the controller is configured to:
  - determine equalizer coefficient information that corresponds to the first equalizer coefficients and that is configured to be used by the second communication device to determine initial values of at least some of second equalizer coefficients to be used when adapting a second adaptive equalizer during the second portion of the training procedure, and
  - control the transceiver to transmit the equalizer coefficient information to the second communication device.

25. The first communication device of claim 23, wherein:
- the one or more signal processors comprise a first far-end crosstalk canceller configured to develop, during the first portion of the training procedure, first far-end crosstalk cancellation parameters to be used by the first communication device to process signals received by the first communication device via the full-duplex communication link; and
- the controller is further configured to:
  - determine far-end crosstalk cancellation information that corresponds to the first far-end crosstalk cancellation parameters and that is configured to be used by the second communication device to determine initial values of at least some of second far-end crosstalk cancellation parameters to be used when adapting a second far-end crosstalk canceller during the second portion of the training procedure, and
  - control the transceiver to transmit the far-end crosstalk cancellation information to the second communication device.

26. The first communication device of claim 21, wherein:
- the controller is configured to control the transceiver to transmit first training signals to the second communication device during the first portion of the training procedure; and
- the one or more signal processors are configured to develop the first signal processing parameters based on the transmission of the first training signals.

27. The first communication device of claim 26, wherein at least one of i) and ii):
- i) the one or more signal processors comprise an echo canceller; and the controller is further configured to:
  - determine echo cancellation information corresponding to first echo cancellation parameters developed by the echo canceller during the first portion of the training procedure, and
  - control the transceiver to transmit the echo cancellation information to the second communication device; and
- ii) the one or more signal processors comprise a near-end crosstalk canceller; and the controller is further configured to:
  - determine near-end crosstalk cancellation information corresponding to first near-end crosstalk cancellation parameters developed by the near-end crosstalk canceller during the first portion of the training procedure, and
  - control the transceiver to transmit the near-end crosstalk cancellation information to the second communication device.

* * * * *